US012707416B2

(12) United States Patent
Qi

(10) Patent No.: US 12,707,416 B2
(45) Date of Patent: Aug. 11, 2026

(54) METHOD AND APPARATUS FOR POSITIONING OF USER EQUIPMENT

(71) Applicant: Samsung Electronics Co., Ltd., Suwon-si (KR)

(72) Inventor: Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 575 days.

(21) Appl. No.: 18/006,892

(22) PCT Filed: Jan. 14, 2021

(86) PCT No.: PCT/KR2021/000562
§ 371 (c)(1),
(2) Date: Jan. 26, 2023

(87) PCT Pub. No.: WO2022/025371
PCT Pub. Date: Feb. 3, 2022

(65) Prior Publication Data

US 2023/0284171 A1 Sep. 7, 2023

(30) Foreign Application Priority Data

Jul. 28, 2020 (GB) ...................................... 2011665

(51) Int. Cl.
*H04W 64/00* (2009.01)
*H04W 68/00* (2009.01)
*H04W 76/27* (2018.01)

(52) U.S. Cl.
CPC ......... *H04W 64/00* (2013.01); *H04W 68/005* (2013.01); *H04W 76/27* (2018.02)

(58) Field of Classification Search
None
See application file for complete search history.

(56) References Cited

U.S. PATENT DOCUMENTS 10,349,371 B2 7/2019 Park et al.
2012/0046030 A1 2/2012 Siomina et al.
(Continued)

FOREIGN PATENT DOCUMENTS

WO 2013/141771 A1 9/2013
WO 2017/026672 A1 2/2017
WO 2020/140725 A1 7/2020

OTHER PUBLICATIONS

Mitsubishi Electric, "Views on DL and UL positioning techniques", 3GPP TSG RAN WG1 Meeting #96, Feb. 25-Mar. 1, 2019, R1-1902836, 3 pages.

(Continued)

*Primary Examiner* — Suhail Khan

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). Disclosed is method of configuring a positioning operation in a mobile telecommunication network comprising at least one base station and at least on User Equipment, UE, wherein the UE is operable to perform the positioning operation whilst in an idle state, comprising the steps of: providing a reference signal in one of: a default configuration and a look up table format, comprising a plurality of possible configurations.

17 Claims, 4 Drawing Sheets

UPLINK

(56) References Cited

U.S. PATENT DOCUMENTS

| | | | |
|---|---|---|---|
| 2016/0097835 A1 | 4/2016 | Zhang et al. | |
| 2018/0054795 A1 | 2/2018 | Edge | |
| 2019/0182794 A1 | 6/2019 | Wong et al. | |
| 2019/0357011 A1 | 11/2019 | Edge et al. | |
| 2020/0229130 A1 | 7/2020 | Keating et al. | |
| 2021/0329443 A1 | 10/2021 | Si et al. | |
| 2023/0035967 A1 * | 2/2023 | Manolakos | H04L 27/2605 |

OTHER PUBLICATIONS

Xiaomi Communications, “Positioning enhancements for RRC Idle and RRC Inactive state UE”, 3GPP TSG RAN WG1 #101, May 25-Jun. 5, 2020, R1-2003977, 3 pages.
International Search Report dated Apr. 15, 2021 in connection with International Patent Application No. PCT/KR2021/00562, 3 pages.
Written Opinion of the International Searching Authority dated Apr. 15, 2021 in connection with International Patent Application No. PCT/KR2021/000562, 6 pages.
Combined Search and Examination Report under Section 17 and 18(3) dated Jan. 8, 2021 in connection with United Kingdom Patent Application No. GB2011665.3, 7 pages.

* cited by examiner

[Fig. 1]
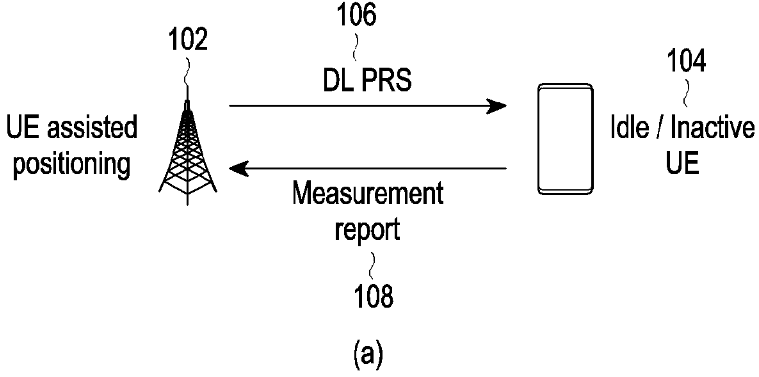
(a)
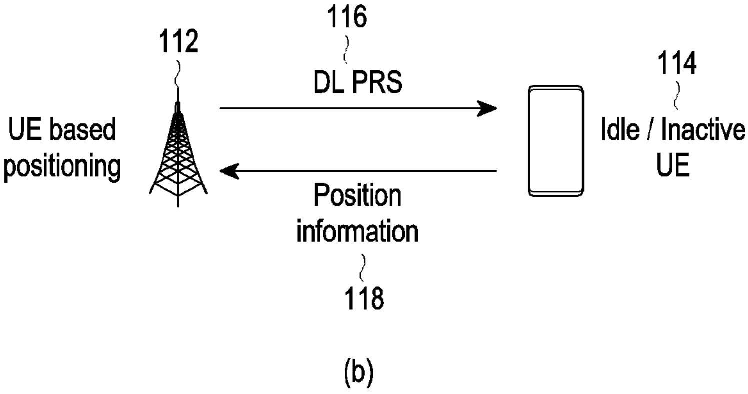
(b)
DOWNLINK
[Fig. 2]
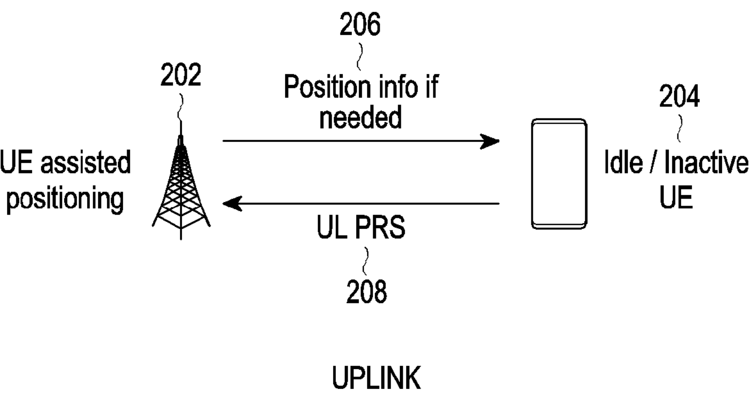
UPLINK

[Fig. 3]
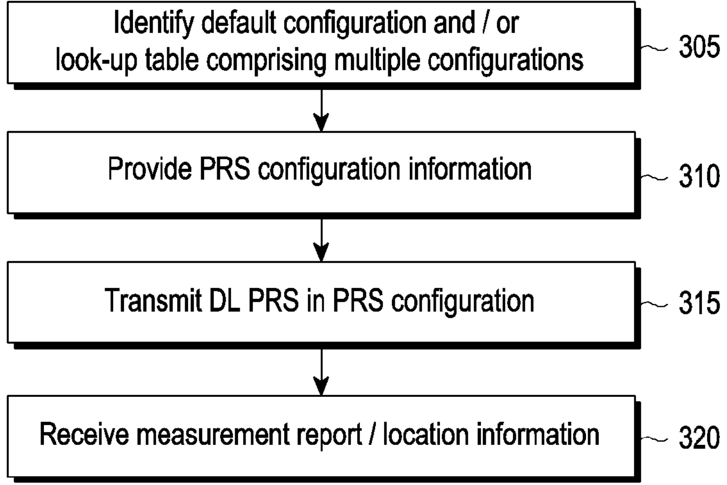
[Fig. 4]
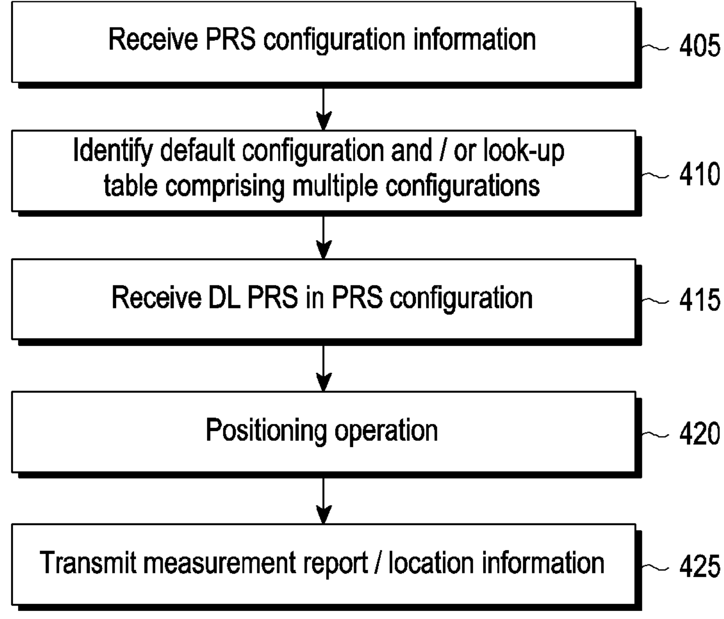

[Fig. 5]
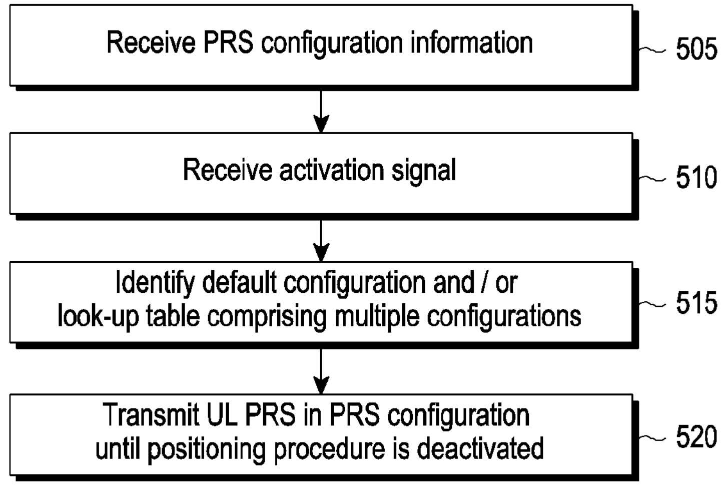
[Fig. 6]
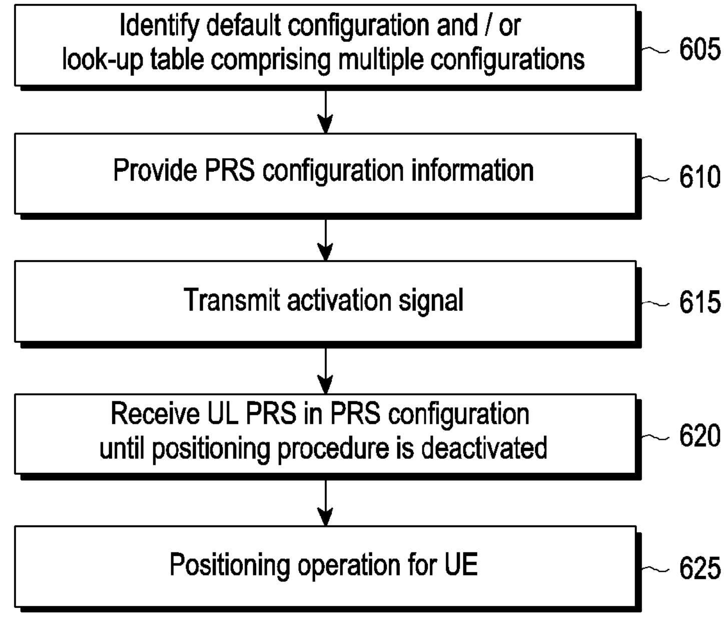
[Fig. 7]
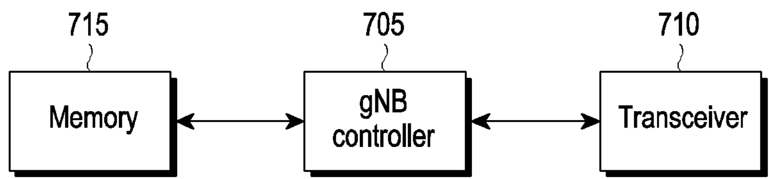

[Fig. 8]
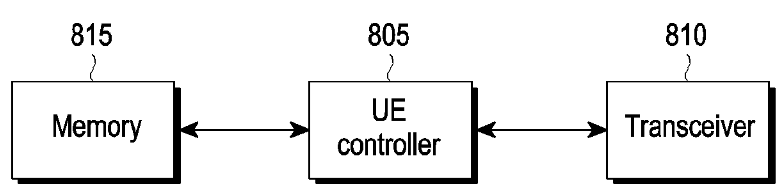

METHOD AND APPARATUS FOR POSITIONING OF USER EQUIPMENT

CROSS-REFERENCE TO RELATED APPLICATIONS

This application is a 371 National Stage of International Application No. PCT/KR2021/000562 filed on Jan. 14, 2021, which claims priority to United Kingdom Patent Application No. 2011665.3 filed on Jul. 28, 2020, the disclosures of which are herein incorporated by reference in their entirety.

BACKGROUND

1. Field

The present disclosure relates to improvements to determining the position of a User Equipment, UE, when the UE is an idle, inactive or non-connected state.

2. Description of Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Positioning i.e. locating a UE in space is required in a variety of situations. For many years, UE positioning has been accomplished with Global Navigation Satellite Systems, GNSS, such as GPS, assisted by cellular networks. This approach provides accurate positioning but is typically limited to outdoor areas with satellite visibility. There is currently a range of applications that requires accurate positioning not only outdoors but also indoors. Architecture-wise, NR positioning is based on the use of a location server, similar to prior art LTE systems. The location server collects and distributes information related to positioning (UE capabilities, assistance data, measurements, position estimates and so on) to the other entities involved in the positioning procedures. A range of positioning methods, both Downlink, DL-based and Uplink UL-based, are used separately or in combination to meet the accuracy requirements for different scenarios.

DL-based positioning is supported by providing a new reference signal called the positioning reference signal (PRS). Compared with LTE, the PRS in NR has a more regular structure and a much larger bandwidth, which allows for a more precise correlation and time of arrival (ToA) estimation. The UE can then report the ToA difference for PRSs received from multiple distinct base stations, gNBs, and the location server can use the reports to determine the position of the UE.

UL-based positioning is based on the Sounding Reference Signals (SRS). Based on the received SRS signals, the base stations can measure and report (to the location server) the arrival time, the received power and the angle of arrival from which the position of the UE can be estimated. The time difference between DL reception and UL transmission can also be reported and used in round-trip time (RTT) based positioning schemes, where the distance between a base station and a UE can be determined based on the estimated RTT. By combining several such RTT measurements, involving different base stations, the position can be determined.

SUMMARY

In the prior art, positioning can typically only be preformed when the UE in question is an active or connected state.

Embodiments of the present disclosure facilitate positioning for a UE in an idle or inactive state.

According to an embodiment of the present disclosure, there is provided a method of configuring a positioning operation in a mobile telecommunication network comprising at least one base station and at least on user equipment, UE, wherein the UE is operable to perform the positioning operation whilst in an idle or inactive state, comprising: providing a reference signal in one of: a default configuration and a look up table, comprising a plurality of configurations.

In an embodiment, the reference signal is provided in a downlink in a case of downlink positioning or in an uplink in a case of uplink positioning.

In an embodiment, in the downlink, the reference signal is a positioning reference signal, PRS, and in the uplink, the reference signal is a sounding reference signal, SRS.

In an embodiment, a configuration of the reference signal is one of: predefined; broadcast in system information; inserted in a physical downlink control channel, PDCCH; and inserted in a paging channel in a physical downlink shared channel, PDSCH.

In an embodiment, the UE begins the positioning operation upon one of: receipt of an activation message from the base station, and an expiration of a timer.

In an embodiment, the activation message is one of: broadcast, and dynamically configured.

In an embodiment, the reference signal is arranged to match a periodicity of a discontinuous reception, DRX, cycle.

In an embodiment, the UE buffers measurement results and/or location information and transmits the measurement results and/or location information when there is a traffic to be transmitted in either a connected or idle state.

In an embodiment, for the measurement report or the location information, a first report includes an absolute value and subsequent reports include delta values related to the absolute value.

According to an embodiment of the present disclosure, there is provided apparatus arranged to perform the method of the first aspect.

In an embodiment, the apparatus comprises at least one UE and at least one base station.

Although a few preferred embodiments of the present disclosure have been shown and described, it will be appreciated by those skilled in the art that various changes and modifications might be made without departing from the scope of the present disclosure, as defined in the appended claims.

According to the present disclosure there is provided an apparatus and method as set forth in the appended claims. Other features of the present disclosure will be apparent from the dependent claims, and the description which follows.

BRIEF DESCRIPTION OF THE DRAWINGS

For a better understanding of the present disclosure, and to show how embodiments of the same may be carried into effect, reference will now be made, by way of example only, to the accompanying diagrammatic drawings in which:

FIG. 1 illustrates downlink positioning according to an embodiment of the present disclosure; and FIG. 2 illustrates uplink positioning according to an embodiment of the present disclosure.

FIG. 3 shows the flow chart illustrating an operation of a gNB for UE positioning.

FIG. 4 shows the flow chart illustrating an operation of an UE for UE positioning.

FIG. 5 shows the flow chart illustrating an operation of an UE for UE positioning.

FIG. 6 shows the flow chart illustrating an operation of a gNB for UE positioning.

FIG. 7 is a block diagram illustrating a configuration of a gNB according to an embodiment.

FIG. 8 is a block diagram illustrating a configuration of a UE according to an embodiment.

DETAILED DESCRIPTION

Embodiments of the present disclosure relate particularly but not exclusively to New Radio, NR, implementations in the Fifth Generation, 5G, telecommunication system, although other systems may benefit from the techniques disclosed herein.

Furthermore, embodiments of the present disclosure find particular utility in Internet of Things (IoT) and especially Industrial IoT, IIoT, applications.

FIGS. 1, and 2 illustrate the general operation of embodiments of the present disclosure in downlink and uplink scenarios, respectively.

FIG. 1(*a*) shows how the UE 104 in idle/inactive state is operable to participate in UE-assisted positioning. The UE 104 receives PRS 106, and prepares a measurement report 108. The measurement report 108 is transmitted to the gNB 102, which performs a positioning process to determine the UE position.

FIG. 1(*b*) shows how the UE 114 in idle/inactive state is operable to participate in UE-based positioning. The UE 114 receives PRS 116, calculates its position 118 and reports this 118 to the gNB 112.

FIG. 2 shows how the UE 204 is operable to participate in UE-assisted positioning. The UE receives, if needed, position info 208 and transmits to the gNB 202 a PRS signal 206. The gNB 202 is operable to calculate the position of the UE 204.

NR positioning can be available for Radio Resource Control, RRC, connected state and the configuration of Positioning Reference Signal, PRS, including Downlink, DL, PRS and Uplink, UL, PRS (e.g. Sounding Reference Signal, SRS) can be configured by RRC or upper layer signaling. However, in the RRC idle state, the UE is unable to receive PRS configuration signaling via upper layer signaling. As such, embodiments of the present disclosure provide a means by which NR positioning may be configured and carried out in the idle state. In the present application, the term positioning reference signal is intended as a generic term to include any reference signal in the uplink or downlink which can be used for positioning purposes. As such, PRS, which is a term of art, is only one possible positioning reference signal and unless the context dictates otherwise, PRS is to be interpreted broadly to include any suitable reference signal, including but not limited to PRS as known in the art.

FIG. 3 shows the flow chart illustrating an operation of a gNB for UE positioning.

Referring to FIG. 3, in step 305, the gNB may identify a default configuration and/or a look up table comprising multiple configurations for DL PRS. In step 310, the gNB may provide PRS configuration information including the default configuration and/or one or more configurations, to the UE. In step 315, DL PRS in at least one PRS configuration may be transmitted from the gNB. The UE may receive the DL PRS, and then perform a positioning process. In step 320, the gNB may receive measurement report or location information. In one embodiment, the measurement report or location information may comprise the ToA difference for DL PRSs to be used to determine the position of the UE.

FIG. 4 shows the flow chart illustrating an operation of an UE for UE positioning.

Referring to FIG. 4, in step 405, the UE may receive PRS configuration information including the default configuration and/or one or more configurations, from the gNB. In step 410, the UE may identify the default configuration and/or a look up table comprising multiple configurations. In step 415, the UE may receive DL PRS in at least one PRS configuration, and in step 420 perform the positioning process. In step 425, the UE may transmit measurement report or location information to the gNB. In one embodiment, the measurement report or location information may comprise the ToA difference for DL PRSs to be used to determine the position of the UE.

FIG. 5 shows the flow chart illustrating an operation of an UE for UE positioning.

Referring to FIG. 5, in step 505, the UE may receive PRS configuration information including the default configuration and/or one or more configurations, from the gNB. In step 510, the UE may receive an activation signal, and then, in step 515, the UE may identify the default configuration and/or a look up table comprising multiple configurations. In step 520, the UE may transmit UL PRS in at least one PRS configuration until position procedure is deactivated. The gNB may receive the UL PRS, and the UL PRS may be used for UE positioning.

FIG. 6 shows the flow chart illustrating an operation of a gNB for UE positioning.

Referring to FIG. 6, in step 605, the gNB may identify a default configuration and/or a look up table comprising multiple configurations for UL PRS. In step 610, the gNB may provide PRS configuration information including the default configuration and/or one or more configurations, to the UE. In step 615, the gNB may transmit an activation signal for UE positioning. In step 620, the gNB may receive UL PRS in at least one PRS configuration until positioning procedure is deactivated. In step 625, the UL PRS is used for the positioning operation in the gNB or the location server.

In a first embodiment, for DL PRS, the PRS configuration, including periodicity and pattern may be pre-defined in at least one of following ways. In a first way, a default PRS configuration is pre-defined and the UE assumes this default pre-defined PRS configuration. In a second way, a look up table, LUT, is pre-defined with several possible configurations, each including different combinations periodicity and pattern. The UE assumes a default configuration at first and then detects another configuration blindly. In this context, "blindly" means that the UE starts by assuming the default configuration and if the detection fails, it will try other configurations until the detection succeeds.

In a second embodiment, PRS configuration information is broad case in System Information, which is transmitted from the base station (gNB). This can be included in a System Information Block, SIB. In a first alternative, a default PRS configuration is broadcast, In a second alternative, a look-up table, LUT, is pre-defined with multiple configurations, including different combinations of periodicity and pattern and one or more such configurations can be broadcast by the gNB.

In a third embodiment, the PRS configuration is inserted into the Physical Downlink Control Channel, PDCCH. This can be detected by the UE since the UE needs to wake up periodically to check PDCCH. In a first alternative, a default PRS configuration is inserted in PDCCH. In a second alternative, a look-up table is pre-defined with multiple configurations including different combinations of periodicity and pattern and one or more such configuration is inserted into PDCCH for reception by the UE.

In a fourth embodiment, the PRS configuration is inserted into a paging channel in the Physical Data Shared Channel, PDSCH, since the UE needs to wake up periodically to check paging. In a first alternative, a default PRS configuration is inserted in paging channel. In a second alternative, a look-up table is pre-defined with multiple configurations including different combinations of periodicity and pattern and one or more such configuration is inserted into the paging channel of PDSCH for reception by the UE.

In each of the embodiments referred to above, the flexibility of PRS configuration is increased at the cost of an increased signaling overhead in each case.

For UL positioning, since the UE does not transmit in RRC idle state, an UL positioning signal, PRS e.g., SRS, can not be transmitted. If UL PRS is needed, a periodic UL PRS is configured. Semi-static UL PRS or aperiodic UL PRS can also be configured and for such configuration, an indication signal is needed to activate or de-activate UL PRS transmission.

There are several possible embodiments for UL positioning.

In a first embodiment, a pre-defined configuration is provided. In a first alternative, a default UL PRS configuration is pre-defined and the UE assumes this default PRS configuration. In a second alternative, a look-up table, LUT, is pre-defined with multiple configurations including different combinations of periodicity and pattern, and the UE autonomously chooses one configuration based on positioning requirements, such as accuracy and latency, and the Transmission Points, TRPs, detect such configuration blindly.

In a second embodiment, the UL PRS activation/de-activation signal and/or configuration can be broadcast in system information from the gNB(s) in e.g. an SIB. In a first alternative, a default UL PRS configuration is broadcast. In a second alternative, a look-up table LUT is pre-defined with multiple configurations including different combinations of periodicity and pattern, and such configurations can be broadcast by the gNB(s).

In a third embodiment, a UL PRS activation/de-activation signal and/or configuration can be inserted in PDCCH, since the UE needs to wake up periodically to check PDCCH. The UE keeps transmitting UL PRS until it receives a de-activation signal from the gNB. In a first alternative, a default UL PRS configuration is inserted in PDCCH. In a second alternative, a look-up table is pre-defined with multiple configurations including different combinations of periodicity and pattern, and such configurations are inserted in PDCCH.

In a fourth embodiment, a UL PRS activation/de-activation signal and/or configuration is inserted in a paging channel in PDSCH, since the UE needs to wake up periodically to check paging. The UE keeps transmitting UL PRS until it receives a de-activation signal from the gNB. In a first alternative, a default UL PRS configuration is inserted in the paging channel. In a second alternative, a look-up table is pre-defined with multiple configurations including different combinations of periodicity and pattern, and such configurations are inserted in the paging channel.

In order to reduce UE power consumption, the UE only starts the positioning procedure when necessary. As such, an activation/de-activation signaling procedure is used for both DL and UL. Different arrangements are available configure such indication bit(s). In a first option, the indication bit(s) can be broadcast or dynamically configured. For dynamic configuration, it can be included in PDCCH or a paging channel. In a second option, a timer is set for activation/de-activation. Once the timer expires, the positioning procedure is activated/deactivated as required.

Further, if the UE is in a long Discontinuous Reception (DRX) cycle in the idle state, then the periodicity of DRX is arranged to match with PRS periodicity so that the UE is able to detect PRS or transmit PRS when it wakes up.

In the RRC idle state, the UE only wakes up to detect a received signal but does not transmit any signal unless it finds its own identity in the paging channel. For UE based positioning, the UE can receive DL PRS and perform the necessary positioning calculation. However, for gNB based positioning, the UE needs to report its measurement results to gNBs so that the location server can perform the positioning operation. Even for UE based positioning, it is meaningless to calculate the UE location only at the UE side, and the UE needs to report its location to the gNB. Several alternative means of achieving this are possible.

In a first option, the UE buffers all measurement results and/or its location information and waits for an occasion when there is UL traffic to be transmitted in RRC connected state. Then all or part of all measurement results and/or its location information, e.g., the latest results and/or location information, can be transmitted to gNBs on such an occasion.

In a second option, the UE buffers all measurement results and/or its location information and waits for an occasion when there is UL traffic to be transmitted in RRC inactive state. Then all or part of all measurement results and/or its location information, e.g., the latest results and/or location information, can be transmitted to gNBs on such an occasion. Even though the UE is in the idle/inactive state, a small amount of data can be transmitted, which is the case here.

In a third option, a report request indication signal can be defined. This can either be dynamically configured e.g. in PDCCH or in paging channel) or a timer can be set for activation/de-activation, so that once the timer expires, reporting is activated/deactivated, as required.

If the UE does not always wait for an RRC connected state to do measurement reporting, the total amount of bits a report can contain is limited due to the transmission restriction in RRC idle or inactive state. In such a case, the size of a report is reduced, and an incremental reporting mechanism is adopted. This may take one of several forms.

In a first option, for the first report, the UE reports absolute values X and for the following reporting, the UE only reports a difference against the last report i.e. ΔX. In a second option, for every n-th report, the UE reports the absolute value X and for the remaining n−1 reports, the UE only reports the difference compared to the last report ΔX, where n is either pre-defined or configured by the network via system information, or upper layer signaling, or dynamically by DCI. In a third option, the UE can switch between two reporting modes: 1) reporting absolute values, and 2) reporting only incremental values. The switching is autonomous, and the criterion can be based on one or more of: positioning accuracy; positioning error; ΔX being too large in value; and a switching timer expires.

The switching may also be configured by the network via system information, or upper layer signaling, or dynamically by DCI.

FIG. 7 is a block diagram illustrating a configuration of a gNB according to an embodiment.

Referring FIG. 7, the gNB may comprise a memory 715, a transceiver 710, and a gNB controller 705 (including at least one processor). The transceiver 710 may transmit signals and information likely as PRS configuration, and/or DL PRS, and receive signals and information likely as UL PRS and/or measurement report/location information according to embodiments of the present disclosure. The gNB controller 705 may control operations of the transceiver 710. The memory 715 may store a default configuration and/or a look up table comprising multiple configurations for DL PRS and/or UL PRS.

FIG. 8 is a block diagram illustrating a configuration of a UE according to an embodiment.

Referring FIG. 8, the UE may comprise a memory 815, a transceiver 810, and an UE controller 805 (including at least one processor). The transceiver 810 may receive signals and information likely as PRS configuration, and/or DL PRS, and transmit signals and information likely as UL PRS and/or measurement report/location information according to embodiments of the present disclosure. The UE controller 805 may control operations of the transceiver 710, and perform the positioning operation. The memory 815 may store a default configuration and/or a look up table comprising multiple configurations for DL PRS and/or UL PRS.

Embodiments of the present disclosure provide a means by which NR positioning in an idle or inactive state may be provided in a manner which provides for high accuracy, low latency, network efficiency and device efficiency.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The present disclosure is not restricted to the details of the foregoing embodiment(s). The present disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A method of positioning in mobile telecommunication network comprising a user equipment (UE), the method performed by the UE comprising:

identifying a state of the UE, wherein the state of the UE is a radio resource control (RRC) idle state or a RRC inactive state;

receiving, via a higher layer signaling, positioning reference signal (PRS) configuration information on a paging channel in case that the state of the UE is the RRC idle state or the RRC inactive state;

receiving an activation signal for initiating a positioning procedure while the UE is in the RRC idle state or the RRC inactive state;

in response to the activation signal, identifying a PRS configuration from among a default configuration or a plurality of configurations;

receiving, from a base station, a downlink (DL) PRS based on the identified PRS configuration;

performing a positioning operation based on the DL PRS; and transmitting, to the base station, an uplink (UL) PRS according to the identified PRS configuration until the positioning procedure is deactivated.

2. The method of claim 1, wherein the PRS configuration information comprises the default configuration or a look up table comprising the plurality of configurations.

3. The method of claim 2, wherein the look up table comprises the plurality of configurations including different combinations of a periodicity and a pattern.

4. A method of positioning in mobile telecommunication network comprising a user equipment (UE), the method performed by the UE comprising:

identifying a state of the UE, wherein the state of the UE is a radio resource control (RRC) idle state or a RRC inactive state;

receiving, via a higher layer signaling, (UL) positioning reference signal (PRS) configuration information on a paging channel in case that the state of the UE is the RRC idle state or the RRC inactive state;

receiving, via the paging channel, an activation signal for initiating a positioning procedure while the UE is in the RRC idle state or the RRC inactive state;

in response to the activation signal, identifying a PRS configuration from among a default configuration or a plurality of configurations; and based on receiving the activation signal, transmitting an uplink (UL) PRS by according to the PRS configuration until the positioning procedure is deactivated.

5. The method of claim 4, wherein the UL PRS configuration information comprises a default configuration or a look up table comprising a plurality of configurations, and wherein the UE is configured to identify the configuration from among the default configuration and/or the plurality of configurations.

6. The method of claim 5, wherein the look up table comprises the plurality of configurations including different combinations of a periodicity and a pattern.

7. A method of configuring a positioning operation in mobile telecommunication network comprising a base station, the method performed by the base station comprising:

configuring, in a first paging channel, downlink (DL) positioning reference signal (PRS) configuration information;

transmitting the DL PRS configuration information on the first paging channel;

transmitting a DL PRS based on the DL PRS configuration information;

receiving, from a first UE, measurement report or location information related to a positioning operation based on the DL PRS, configuring, in a second paging channel, an uplink (UL) positioning reference signal (PRS) configuration information;

transmitting the UL PRS configuration information on the second paging channel;

transmitting, on the second paging channel, an activation signal for initiating a positioning procedure while the UE is in a radio resource control (RRC) idle state or an RRC inactive state;

receiving, from a second UE, an UL PRS according to the UL PRS configuration information until the positioning procedure is deactivated; and performing a positioning operation of the UE based on the UL PRS.

8. The method of claim 7, wherein the DL PRS configuration information comprises a default configuration or a look up table comprising a plurality of configurations.

9. The method of claim 8, wherein the look up table comprises the plurality of configurations including different combinations of a periodicity and a pattern.

10. The method of claim 7, wherein the UL PRS configuration information comprises a default configuration and/or a look up table comprising a plurality of configurations, and wherein the base station is configured to blindly detect a configuration related to the UL PRS from among the default configuration or the plurality of configurations.

11. The method of claim 10, wherein the look up table comprises the plurality of configurations including different combinations of a periodicity and a pattern.

12. The method of claim 7, further comprising:

transmitting a deactivation signal of the UL positioning via the paging channel.

13. An apparatus of positioning in mobile telecommunication network comprising a user equipment (UE), the apparatus of the UE comprising:

a transceiver; and a processor configured to:

identify a state of the UE, wherein the state of the UE is a radio resource control (RRC) idle state or a RRC inactive state, receive, via a higher layer signaling, downlink (DL) positioning reference signal (PRS) configuration information on a first paging channel in case that the state of the UE is the RRC idle state or the RRC inactive state, receive, from a base station, a DL PRS based on the DL PRS configuration information, perform a positioning operation based on the DL PRS, transmit, to the base station, at least one of measurement report or location information related to the positioning operation, receive, via a second higher layer signaling, an uplink (UL) PRS configuration information on a second paging channel in case that the state of the UE is the RRC idle state or the RRC inactive state;

receive, via the second paging channel, an activation signal for initiating a positioning procedure while the UE is in the RRC idle state or the RRC inactive state; and based on receiving the activation signal, transmit an UL PRS according to the UL PRS configuration information until the positioning procedure is deactivated.

14. The apparatus of claim 13, wherein the DL PRS configuration information comprises a default configuration or a look up table comprising a plurality of configurations, and wherein the processor is configured to identify a first configuration from among the default configuration and/or the plurality of configurations.

15. The apparatus of claim 14, wherein the look up table comprises the plurality of configurations including different combinations of a periodicity and a pattern.

16. The apparatus of claim 13, wherein the UL PRS configuration information comprises a default configuration or a look up table comprising a plurality of configurations, wherein the look up table comprises the plurality of configurations including different combinations of a periodicity and a pattern, and wherein the processor is configured to identify a second configuration from among the default configuration and the plurality of configurations.

17. The apparatus of claim 13, wherein the processor is further configured to keep transmitting the UL PRS until the UE received a deactivation signal by periodically checking a third paging channel in the RRC idle state or the RRC inactive state.

* * * * *